United States Patent
Feuz (10) Patent No.: US 7,549,250 B2
(45) Date of Patent: Jun. 23, 2009

(54) WALK-IN DEVICE FOR GROWING PLANTS

(76) Inventor: Alain Feuz, Badweg 22, Kirchlindach (CH) 3038

( * ) Notice: Subject to any disclaimer, the term of this patent is extended or adjusted under 35 U.S.C. 154(b) by 13 days.

(21) Appl. No.: 11/692,945

(22) Filed: Mar. 29, 2007

(65) Prior Publication Data

US 2008/0236036 A1    Oct. 2, 2008

(51) Int. Cl.
*A01G 31/06* (2006.01)
*A01G 31/02* (2006.01)

(52) U.S. Cl. .............................. 47/60; 47/39

(58) Field of Classification Search ............. 47/59 R, 47/60, 61, 62 R, 62 A, 62 C, 62 N, 65, 65.5, 47/66.1, 66.3, 66.4, 66.6, 39, 82, 83
See application file for complete search history.

(56) References Cited

U.S. PATENT DOCUMENTS

| | | | |
|---|---|---|---|
| 5,617,673 A | * | 4/1997 | Takashima .................. 47/60 |
| 6,604,321 B2 | * | 8/2003 | Marchildon ................ 47/62 R |
| 7,143,544 B2 | * | 12/2006 | Roy ............................. 47/60 |
| 7,401,437 B2 | * | 7/2008 | Dumont ..................... 47/62 R |
| 2006/0230674 A1 | * | 10/2006 | Marchildon ................... 47/60 |

FOREIGN PATENT DOCUMENTS

| | | |
|---|---|---|
| DE | 33 11 226 C1 | 8/1995 |
| FR | 2 680 627 A | 3/1993 |
| RU | 2 028 771 C1 | 2/1995 |
| RU | 2 034 447 C1 | 5/1995 |

* cited by examiner

*Primary Examiner*—T. Nguyen
(74) *Attorney, Agent, or Firm*—Gudrun E. Huckett

(57) ABSTRACT

A walk-in device for growing plants has a shelf system for receiving individual plants. An illumination device for illuminating the individual plants is provided. The shelf system is arranged about the illumination device that is centrally positioned within the shelf system. The shelf system is designed to position the individual plants such that the individual plants are oriented toward the illumination device. The individual segments of the shelf system are movable relative to the illumination device by rollers or on rails.

9 Claims, 9 Drawing Sheets

WALK-IN DEVICE FOR GROWING PLANTS

BACKGROUND OF THE INVENTION

The invention relates to a walk-in device for growing plants. The device comprises a shelf system for receiving individual plants as well as an illumination device for illuminating the plants.

The device according to the invention for growing plants concerns an interior or indoor plant growing system. This means that the plant growing system is a walk-in system.

Walk-in devices for growing plants are known. They comprise a shelf system for receiving individual plants. Since the plants require light for growing, an illumination device for illuminating the plants is provided additionally.

The disadvantage of known devices resides in that the growing area is relatively small and is limited to the footprint area of the device. Moreover, the energy expenditure for the illumination device is comparatively high.

SUMMARY OF THE INVENTION

It is an object of the present invention to provide a walk-in device for growing plants that has improved economic efficiency.

In accordance with the present invention, this is achieved in that the shelf system is arranged about (surrounds) a centrally arranged illumination device wherein the plants arranged on the shelf system are oriented toward the central illumination device.

In this way, an indoor plant growing system of highest economic efficiency is provided. The basic idea resides in a centrally arranged illumination device about which the shelf system that receives the plants is arranged. By means of such a construction, the growing area is approximately doubled in comparison to the footprint area of the device. Furthermore, by means of the central illumination device, the energy expenditure is reduced to a fraction of that of known devices. The plants are grown in individual pots and can be moved within the shelf system or can be replaced. Instead of pots, it is also possible to employ e.g. rock wool elements.

Preferably, according to one embodiment of the present invention, the shelf system is embodied as a cylindrical wall structure or a polygonal wall structure with a vertical central axis. The illumination device is arranged on the central axis. The cylindrical wall structure thus has a round configuration while the polygonal wall structure is a polygonal configuration wherein several vertical wall surfaces or wall elements form the polygon. For example, the polygon can be a square.

According to another embodiment, a first variant of the cylindrical wall structure or of the polygonal wall structure resides in that the wall structure from the start is provided with a wall opening. This wall opening can be in the form of a slot or gap in the wall structure. This wall opening defines an access area for accessing the interior of the device.

A preferred second variant proposes that the cylindrical wall structure or polygonal wall structure has a closed circumference (no access opening), wherein the wall structure has at least one wall segment that is movable in such a way that the interior of the wall structure is accessible. In this way, the circumferential area about the central illumination device is optimally utilized because the wall structure is closed about its entire circumference. Only for maintenance work or monitoring work, the wall structure is opened and the interior is made accessible in this way.

In principle, it is possible that only a single wall segment is movable. According to one embodiment of the present invention, it is proposed that the cylindrical wall structure or polygonal wall structure is comprised of several wall segments that are movable away from the center. In this way, the complete wall structure opens and the interior is accessible from several directions. Primarily, this movability of the wall segments has the advantage that the distance of the plants relative to the central illumination device is variable so that this distance can be adjusted in accordance with the light demands of the plants and with regard to plant size. Inasmuch as the wall structure is a cylindrical wall structure, at least two wall segments are provided. The wall segments have thus an opening angle of 180 degrees. However, three or four or more wall segments are also conceivable.

A first technical realization with regard to movability of the wall segments provides that the wall segments are movable on the ground on rollers. This is the simplest technical realization because this requires only that the metal wall segments are provided with rollers.

As an alternative to the rollers, another embodiment proposes that the wall segments are suspended from top rails and are movable along the top rails. The basic principle resides in a top rail system on which the wall segments are suspended and along which they are movable. The top rail system can be a steel pipe frame system positioned on the ground. As an alternative, it is conceivable that the rails are mounted on the ceiling.

For providing a large area plantation in particular in a warehouse-type environment, according to another embodiment the wall segments of several growing devices are suspended from a topside rail network on which the wall segments of the growing devices are movably suspended. A growing device is arranged at each crossing point of the rails of the rail network. This rail network is constructed at right angles.

According to another embodiment, the shelf system is a wire shelf system. This means that the receptacles for the plants are wire cages configured and arranged so as to orient the plants toward the central illumination device. The cages can also be made from plastic elements or sheet metal elements.

According to another embodiment, the shelf system is provided at the bottom side with a catch basin for water. These catch basins serve for receiving excess water used for watering the plants. Independent of these basins, the system can be supplemented by a watering system for individual pots.

BRIEF DESCRIPTION OF THE DRAWING

Four embodiments of a walk-in device according to the invention for growing plants will be described in the following with the aid of the drawings.

FIG. 1a to FIG. 1c show a first embodiment of a plant growing device with rollers, the device being shown in the closed state, wherein FIG. 1a is perspective view, FIG. 1b is a side view, and FIG. 1c is a top view.

FIG. 1d to FIG. 1f show the plant growing device of FIGS. 1a to 1c in the open state; FIG. 1d is a perspective view; FIG. 1e is a side view; and FIG. 1f is a top view.

FIG. 2a a perspective view of a part of the shelf system of the plant growing device showing the slanted arrangement of the plant receptacles.

FIG. 2b is a side view of the part of the shelf system of FIG. 2a.

FIG. 3a to FIG. 3c show a second embodiment of the plant growing device according to the invention comprising a rail system with top side steel pipe frame system in the closed state; FIG. 3a is a perspective view; FIG. 3b is a side view; and FIG. 3c is a top view.

FIGS. 3d to 3f show the plant growing device of FIGS. 3a to 3c in the open state; FIG. 3d is a perspective view; FIG. 3e is a side view; and FIG. 3f is a top view.

FIGS. 4a to 4c show a third embodiment of the plant growing device in the closed state having a rail system that is mounted on the ceiling; FIG. 4a is a perspective view; FIG. 4b is a side view; and FIG. 4c is a top view.

FIGS. 4d to 4f show the plant growing device of FIGS. 4a to 4c in the open state; FIG. 4d is a perspective view; FIG. 4e is a side view; and FIG. 4f is a top view.

FIG. 5a is a perspective view; FIG. 5b is a top view; and FIG. 5c is a side view.

DESCRIPTION OF THE PREFERRED EMBODIMENTS

Figure 1:
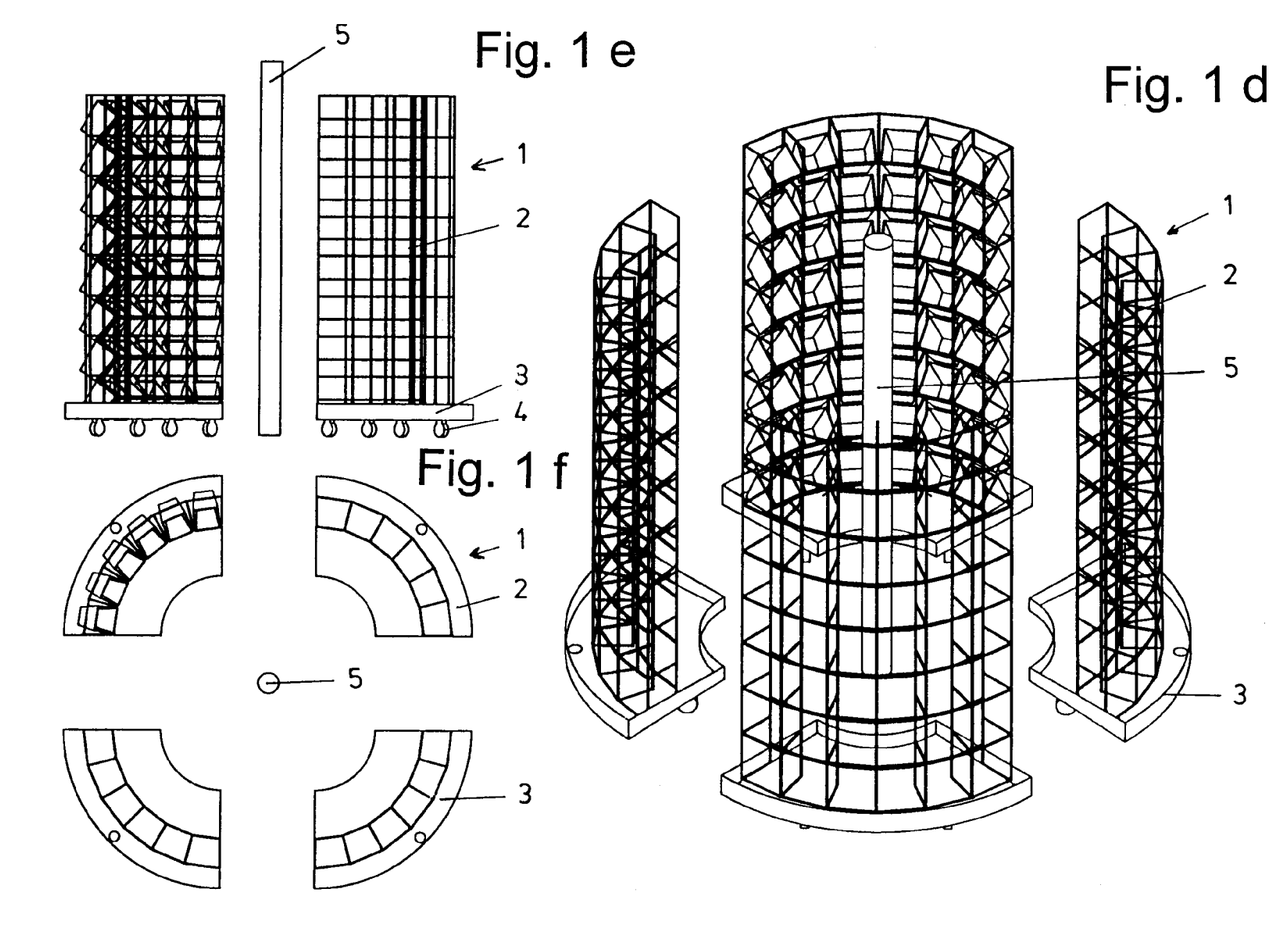
Figure 1A:
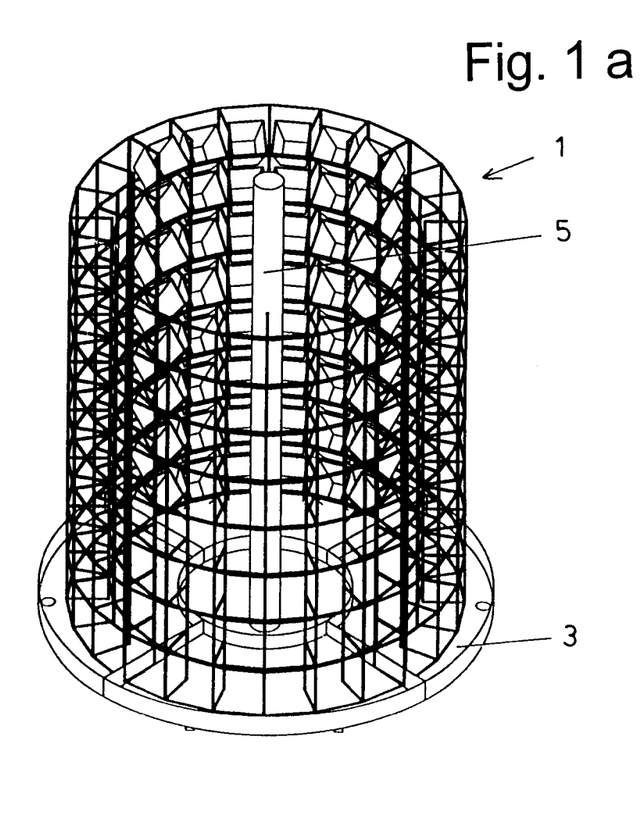
Figure 1B:
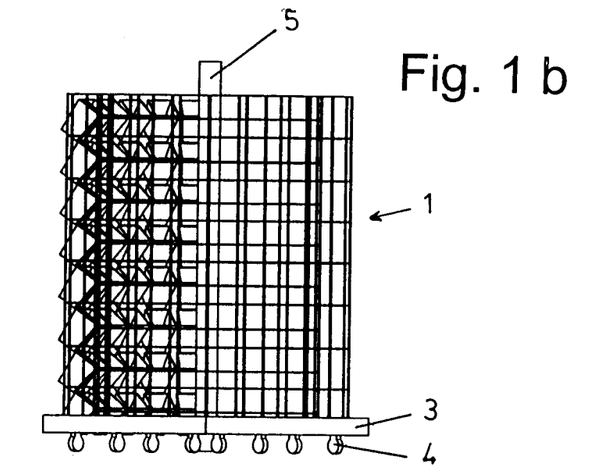
Figure 1C:
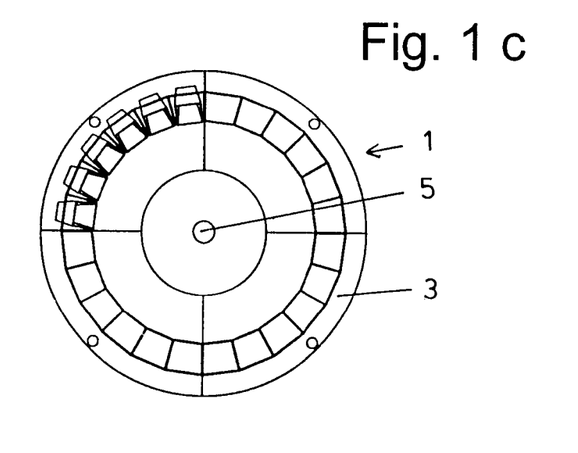

The plant growing device of FIGS. 1a to 1c of the first embodiment has a cylindrical shelf system 1 in the form of a wire shelf system with a vertical central axis. The illustrated cylindrical shelf system 1 is a cylindrical wall structure and is divided into four independent wall segments 2; of course, the wall structure can have a polygonal shape instead of having a cylindrical shape. Each of these wall segments 2 rests on a catch basin 3 for collecting water used for watering the plants. In the illustrated embodiment, the bottom side of the catch basins 3 is provided with rollers 4 so that the wall segments 2 can be moved as they are resting on the basins. Of course, the shelf system 1 itself can be provided with rollers. The plant growing device further comprises an illumination device (growing light) 5 that is arranged at the center of the shelf system 1 of the plant growing device.

The growing device functions as follows.

Figure 2:
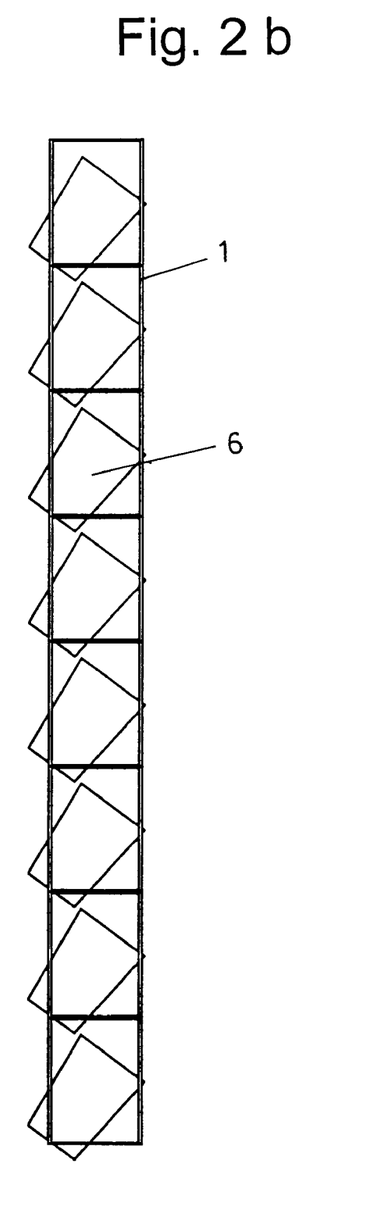
Figure 3:
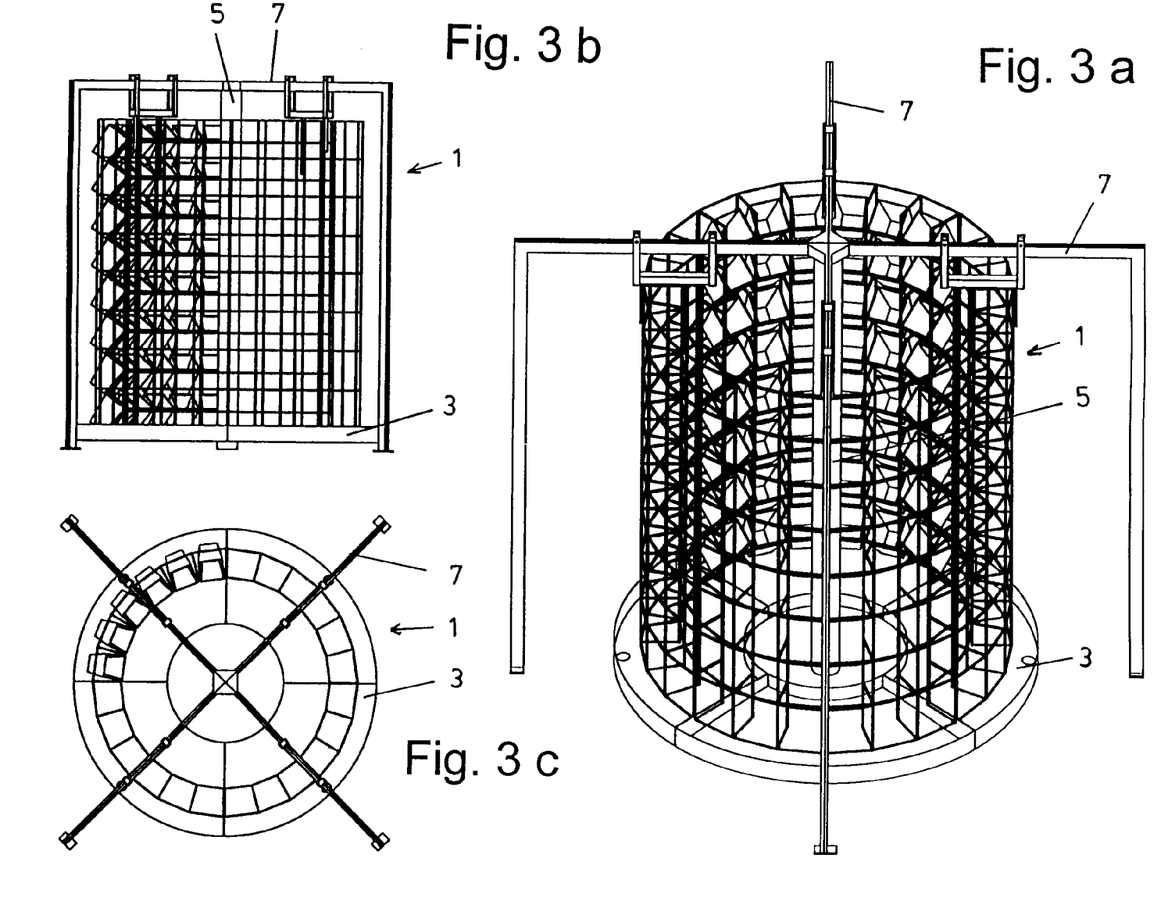
Figure 4:
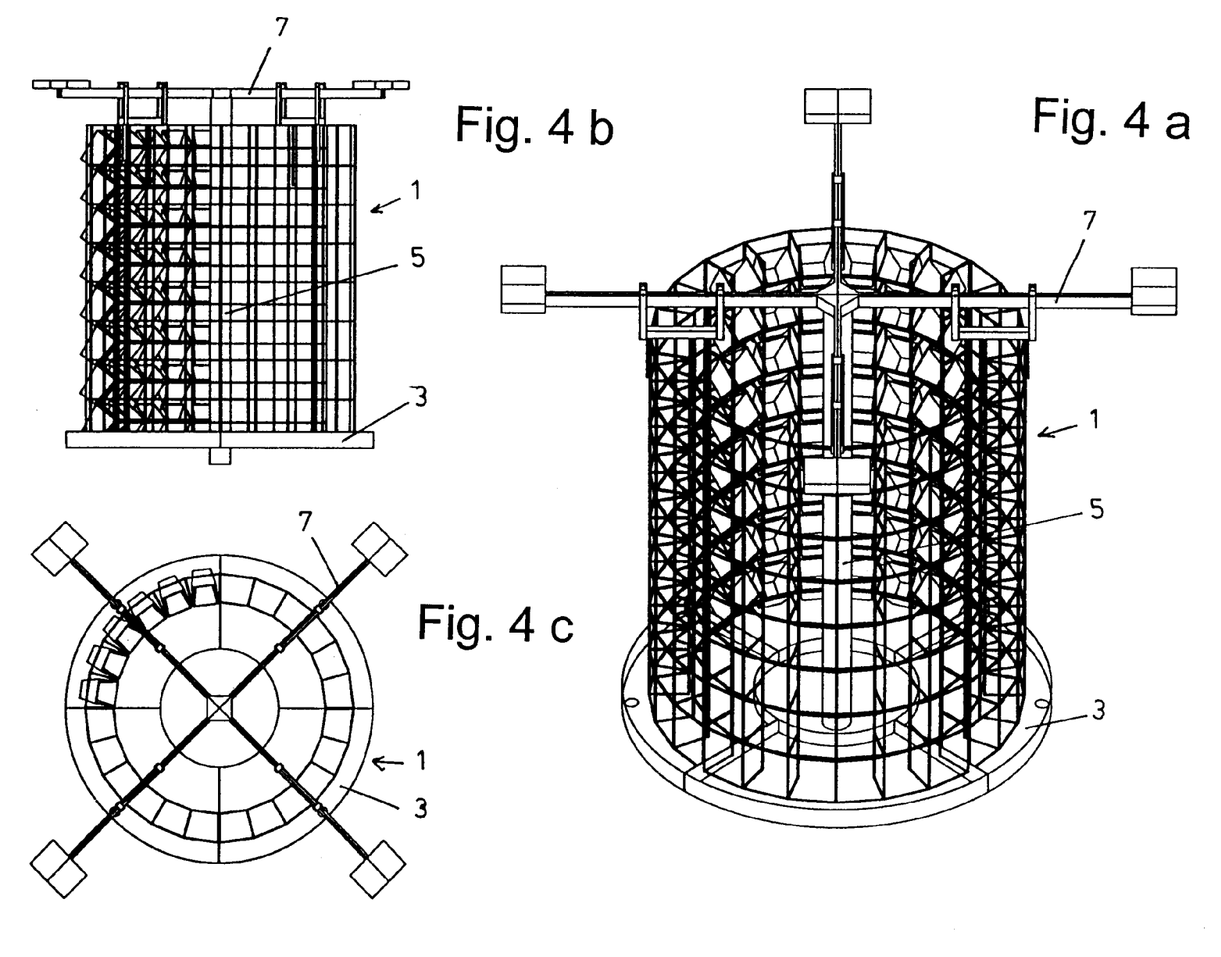

The shelf system 1 serves for receiving a plurality of plant receptacles or plant pots 6. As illustrated in FIGS. 2a and 2b, these plant pots 6 are arranged on the shelf system 1 at a slant in such a way that the plants (not illustrated) are oriented toward the central illumination device 5.

In the basic position, the shelf system 1 with its wall segments 2 is closed as can be seen in FIGS. 1a to 1c, i.e., the circumference is uninterrupted (has no access opening). For monitoring and maintenance work, the wall segments 2 can be moved radially outwardly as illustrated in FIGS. 1d through 1f. In this way, the interior of the cylindrical wall structure is accessible. By means of this moving system, it is moreover possible to vary the distance of the plants relative to the central illumination device 5 in order to adjust the light intensity to the size of the plants.

The second embodiment in FIGS. 3a to 3f differs from the first embodiment in FIGS. 1a to 1f in regard to the moving device for the wall segments 2. Instead of rollers 4, rails 7 are provided that form part of a steel pipe frame system. The wall segments 2 are suspended from the topside horizontal rails 7 and can be moved by means of an appropriate moving device either manually or by a motor along the rails 7.

The third embodiment of FIGS. 4a to 4f also provides a moving device based on a rail system. The rails 7 are however arranged on the ceiling of the building. Accordingly, the wall segments 2 are also suspended from the rails 7 and can be moved in the radial direction.

Figure 5:
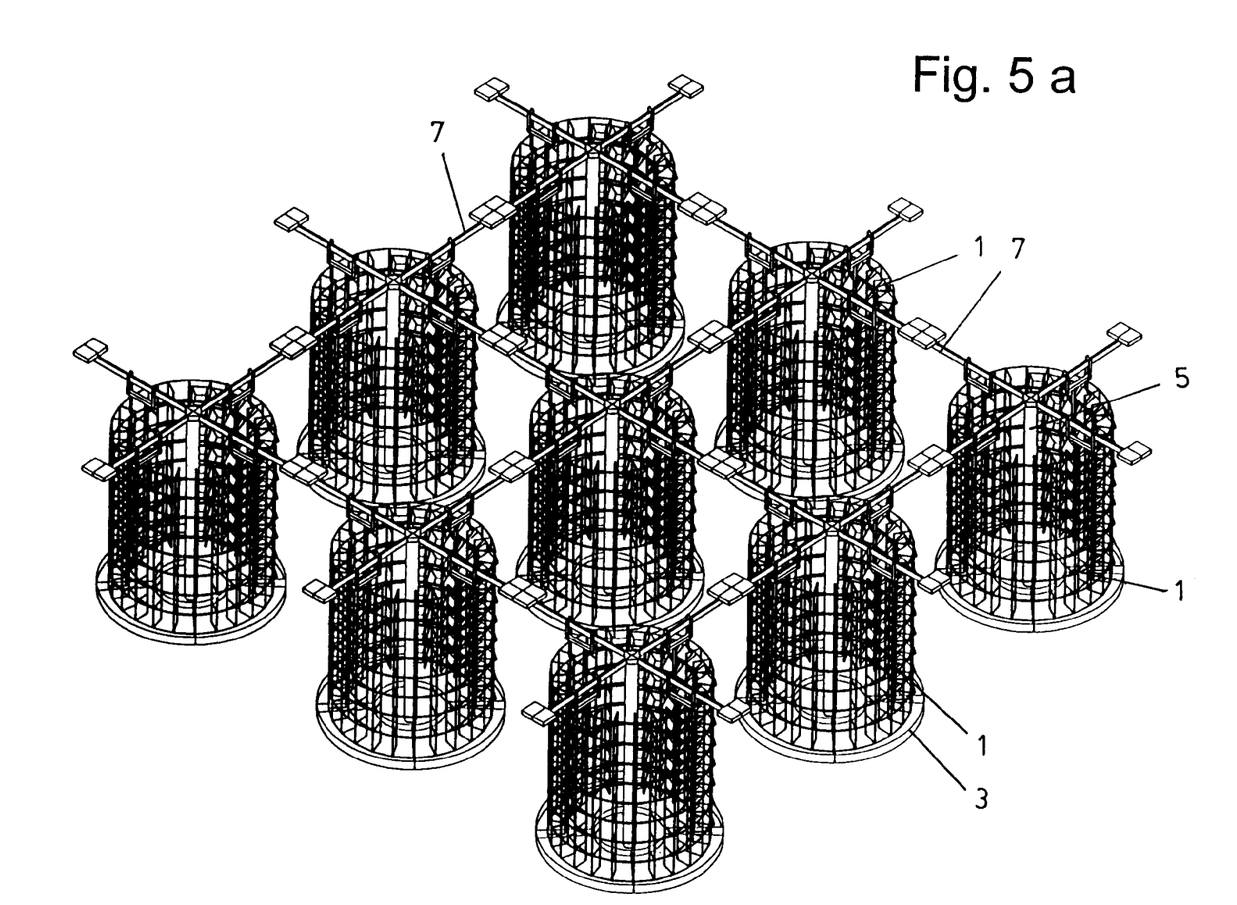
FIG. 5a to 5c show a fourth embodiment of the plant growing device of the present invention based on the system of FIGS. 4a to 4c, wherein the fourth embodiment comprises a network of rails and a plurality of individual plant growing devices.

The fourth embodiment of FIGS. 5a to 5c is based on the third embodiment of FIGS. 4a to 4f. The difference is that a network of rails 7 is provided that accommodates several of the individual growing devices. These rails 7 are arranged on the ceiling and are positioned perpendicularly (at a right angle) relative to one another. At each crossing point, one of the shelf systems 1 comprised of wall segments 2 is provided. These wall segments 2 are movable in the afore described manner along the rails 7. An illumination device 5 is correlated with each shelf system.

While specific embodiments of the invention have been shown and described in detail to illustrate the inventive principles, it will be understood that the invention may be embodied otherwise without departing from such principles.

What is claimed is:

1. A walk-in device for growing plants, comprising:
   a shelf system for receiving individual plants;
   an illumination device for illuminating the individual plants;
   wherein the shelf system is arranged about the illumination device that is centrally positioned within the shelf system;
   wherein the shelf system is adapted to position the individual plants such that the individual plans are oriented toward the illumination device;
   wherein the shelf system is an upright wall structure having a cylindrical shape or a polygonal shape and having a vertical center axis;
   wherein the wall structure comprises at least one upright wall segment that is movable radially away from the vertical center axis in a horizontal direction on a guide means such that an interior of the wall structure is accessible to allow walking in.

2. The device according to claim 1, wherein the wall structure has a wall opening.

3. The device according to claim 1, wherein the wall structure is closed in a circumferential direction.

4. The device according to claim 1, wherein the wall structure is comprised of several of said at least one wall segment.

5. The device according to claim 1, wherein the guide means comprises rollers and the at least one wall segment is horizontally movable on the rollers.

6. The device according to claim 1, wherein the guide means comprise rails arranged above the shelf system wherein the at least one wall segment is suspended from and horizontally movable on the rails.

7. The device according to claim 6, wherein several of said shelf system are provided and wherein the rails form a horizontal network, wherein the at least one wall segment of the shelf systems is movably suspended on the network.

8. The device according to claim 1, wherein the shelf system is a wire shelf system.

9. The device according to claim 1, further comprising a catch basin for collecting water.

* * * * *